July 8, 1930.  F. GRÜBER  1,770,336
LEAD PENCIL SHARPENER
Filed Sept. 3, 1927
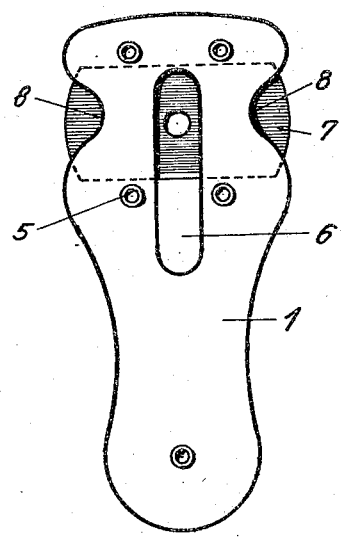 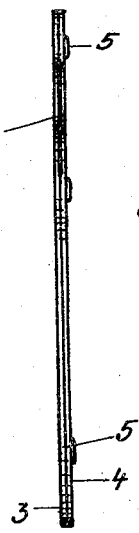 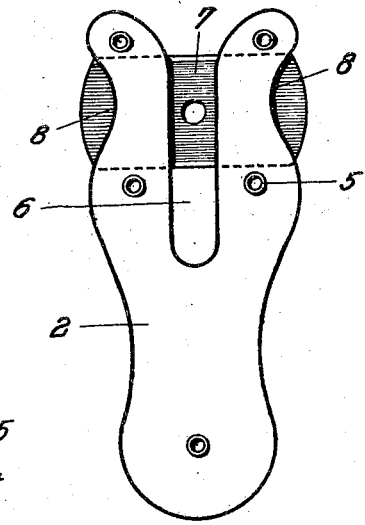 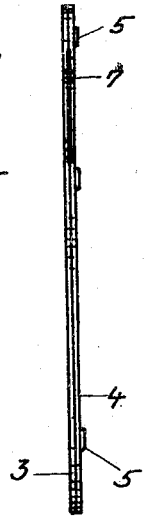
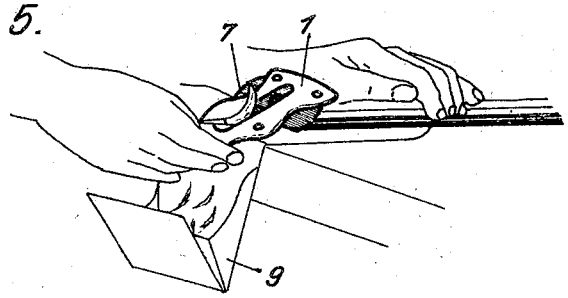
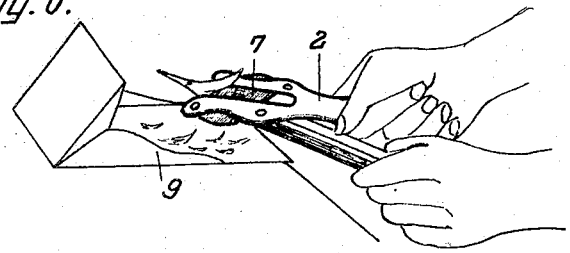
Inventor:
Franz Grüber
by Kunkhaelin
Atty.

Patented July 8, 1930

1,770,336

UNITED STATES PATENT OFFICE

FRANZ GRÜBER, OF ERFURT, GERMANY

LEAD-PENCIL SHARPENER

Application filed September 3, 1927, Serial No. 217,477, and in Germany June 8, 1927.

My invention relates to lead-pencil sharpeners of the type in which a blade is inserted in a holder or handle, and it is an object of my invention to provide an appliance of this type in which the blade is readily exchangeable.

To this end, I provide a holder or handle in which a blade, preferably a safety-razor blade, is held in a recess so as to be readily removed and exchanged by pushing it to one side, or the other side, of the holder. A slot is provided in the holder through which a part of the blade projects and in which the lead pencil is inserted during the sharpening operation.

In the accompanying drawing, two appliances embodying my invention are illustrated diagrammatically by way of example.

In the drawing

Fig. 1 is an elevation, and

Fig. 2 is an end elevation, of an appliance in which the blade is following the handle in operation, Figs. 3 and 4 are similar illustrations of an appliance in which the blade is leading the handle.

Figs. 5 and 6 are perspective views illustrating the application of the first and the second type of appliance, respectively.

Referring now to the drawing, and first to Figs. 1 and 2, 1 is the handle or holder of an appliance in which the blade is following the handle that is in which the blade is pulled across the surface to be cut. The holder comprises two plates 3, 4 of metal, celluloid, fibre, or any suitable material, of identical shape. Rivets or other fastening means 5 are provided for uniting the two plates. A longitudinal slot 6 is provided in each plate and the blade 7 is inserted in a transverse recess of each plate which is in connection with the slot 6 so that the central portion of the blade is exposed in the slot. Instead of recessing the plates 3 and 4 for the reception of the blade 7, as shown, they may be reduced where the blade is inserted, or pitched slightly apart so that the blade is readily inserted and removed. The edges of the holder are cut away at 8 in order to facilitate handling of the blade. The blade may be engaged with the fingers without any risk and is readily removed or adjusted so that practically the entire length of the cutting edge is utilized.

In operation, as illustrated in Fig. 5, the appliance is placed on a lead pencil so that the pencil projects from its slot 6 and by pulling the handle, chips will be detached from the pencil as illustrated. Preferably an etui 9 is placed below the end of the handle for catching the chips, and this etui may also be used as a casing for carrying the appliance.

Referring now to Figs. 3 and 4, this appliance 2 is similar to the appliance described, except for the fact that its slot 6 is open at one end and that portion of the blade which is exposed at the open end, constitutes the cutting edge.

The operation of this appliance is illustrated in Fig. 6 from which it will appear that it is pushed along the lead pencil in the manner of a plane.

I wish it to be understood that I do not desire to be limited to the exact details of construction shown and described for obvious modifications will occur to a person skilled in the art.

I claim:—

1. A lead-pencil sharpener comprising a body having a slot which is open from side to side, and a razor blade inserted in said slot, and comprising two plates which are connected so as to permit the insertion of said blade between them.

2. A lead-pencil sharpener comprising a body having a slot which is open from side to side, extending longitudinally with respect to said body, and a razor blade extending across said slot, two connected plates, each having a recess extending transversely to the longitudinal slot in said body for the reception of said blade.

In testimony whereof I affix my signature.

FRANZ GRÜBER.